M. MACHROL.
FLYWHEEL BALANCER.
APPLICATION FILED SEPT. 2, 1919.

1,352,905.

Patented Sept. 14, 1920.

INVENTOR
Michael Machrol
BY Munn & Co.
ATTORNEYS

UNITED STATES PATENT OFFICE.

MICHAEL MACHROL, OF KENOSHA, WISCONSIN.

FLYWHEEL-BALANCER.

1,352,905. Specification of Letters Patent. Patented Sept. 14, 1920.

Application filed September 2, 1919. Serial No. 321,056.

*To all whom it may concern:*

Be it known that I, MICHAEL MACHROL, a citizen of the United States, and a resident of the city of Kenosha, in the county of Kenosha and State of Wisconsin, have invented a new and useful Improvement in Flywheel-Balancers, of which the following is a full, clear, and exact description.

My invention relates to improvements in fly wheel balancers, and it consists in the combinations, constructions and arrangements herein described and claimed.

An object of my invention is to provide a device by means of which the surplus metal on one side of a fly wheel may be readily located and removed.

A further object of my invention is to provide a device having a scale which will indicate the amount of metal to be removed.

A further object of my invention is to provide a fly balancing device which consists of few parts, and which therefore is easily constructed and not liable to get out of order.

A further object of my invention is to provide a balancing device which may be adjusted to fly wheels of different sizes.

Other objects and advantages will appear in the following specification, and the novel features of the invention will be particularly pointed out in the appended claims.

My invention is illustrated in the accompanying drawings, forming part of this application, in which—

Figure 2:
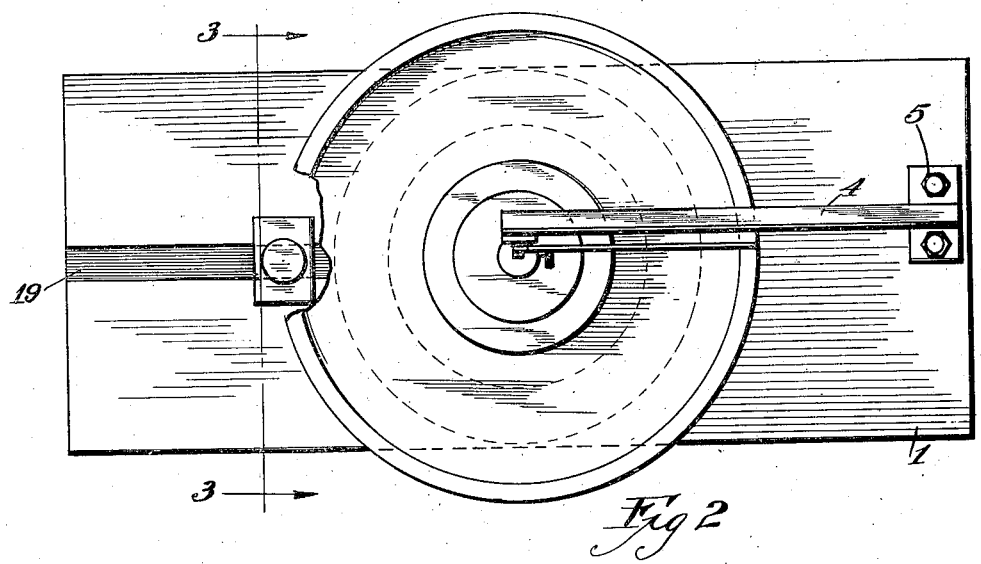
Fig. 2 is a plan view.
Figure 3:
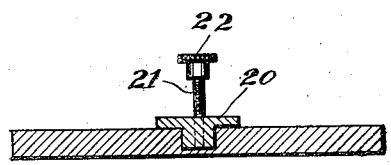
Fig. 3 is a section along the line 3—3 of Fig. 2.

In carrying out my invention, I provide a base 1 of any suitable shape. To this base is secured a fulcrum post 2 of the shape shown in the drawings. The latter has a conical recess 3 at its top. A curved arm 4 is secured at 5 to the base plate, and extends above the center of the fulcrum post 2.

Figure 1:
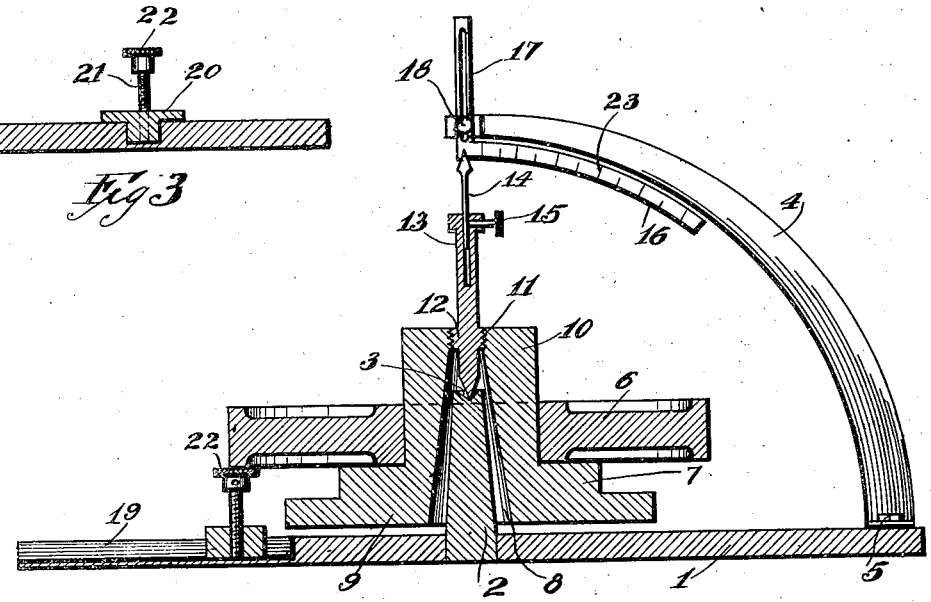
Figure 1 is a central sectional view through the device.

The fly wheel 6 is supported on a block 7 having a conical recess 8 on its under side arranged to receive the fulcrum post 2. This block is provided with one or more shoulders 9, so that fly wheels of different sizes may be supported and balanced. The central portion 10 of the plug 7 extends through the shaft opening in the fly wheel, as shown in Fig. 1. The portion 10 has a threaded opening 11, in which is secured a threaded portion 12 of a rod 13, whose lower end is pointed and which rests in the recess 3 at the top of the post 2, thus suspending the fly wheel. The upper end of the rod 13 is bored to receive an adjustable pointer 14 which may be retained in position by a set screw 15. A scale 16 is carried by an arm 17, which is adjustably secured to the arm 4 by means of a set screw 18, or in any other similar manner.

Mounted in a slot 19 of the base 1 is a slidable block 20, having a screw 21 provided with a supporting head 22.

From the foregoing description of the various parts of the device, the operation thereof may be readily understood. The fly wheel is placed on the block 7, and the pointer 14 is adjusted so as to register with the scale 16. If the heavier part of the fly wheel should swing the pointer away from the scale, then the fly wheel is turned until the pointer swings to a maximum distance to the right in Fig. 1. The scale is provided with marks 23, which indicate the amount of material to be removed from the heavy side of the fly wheel. This may be in pounds, ounces, or any suitable measure. The heavy side of the fly wheel is marked with chalk or any similar material, and thus the wheel is turned so as to bring the heavier side above the supporting member 22, the screw being turned to support the under side of the fly wheel. The latter may now be drilled while being supported by the head 22, and the surplus material removed.

With the device described above, the operation of locating the heavier portion of the fly wheel and of removing the excess portions is greatly facilitated and is rendered very accurate.

By adjusting the scale 23 and the pointer 14, the device may be used to balance fly wheels of different sizes.

I claim:

1. In a fly wheel balancing device, a base, a fulcrum post carried thereby, a fly wheel support having a portion arranged to enter the shaft opening of the center of the fly wheel, said support having a portion arranged to engage and be supported by said fulcrum post, a slidably adjustable pointer carried by said fly wheel support, and a scale coöperating with said pointer for indicating the excess weight on one side of the fly wheel, and being adjustable toward and away from said pointer.

2. A fly wheel balancing device comprising a base, a fulcrum post carried thereby and having a conical shaped recess at the top, a fly wheel supporting block having a recess arranged to receive the upper portion of the fulcrum post, a rod secured to said fly wheel support, the lower end of the rod being pointed and being arranged to rest on the conical shaped recess in said fulcrum post, and an adjustable pointer carried by said rod.

3. A fly wheel balancing device comprising a base, a fulcrum post carried thereby and having a conical shaped recess at the top, a fly wheel supporting block having a recess arranged to receive the upper portion of the fulcrum post, a rod secured to said fly wheel support, the lower end of the rod being pointed and being arranged to rest on the conical shaped recess in said fulcrum post, an adjustable pointer carried by said rod, and an adjustable supporting head carried by the base, and arranged to engage the under side of the fly wheel to permit the drilling of the latter.

4. A fly wheel balancing device comprising a base, a fulcrum post carried thereby and having a conical shaped recess at the top, a fly wheel supporting block having a recess arranged to receive the upper portion of the fulcrum post, a rod secured to said fly wheel support, the lower end of the rod being pointed and being arranged to rest on the conical shaped recess in said fulcrum post, a slidably adjustable pointer carried by said rod, an arc shaped scale support carried by said base and arranged to extend above said pointer and an adjustable scale carried by said scale support and movable toward and away from said pointer.

MICHAEL MACHROL.